(12) United States Patent
Eklund et al.

(10) Patent No.: US 8,066,305 B2
(45) Date of Patent: *Nov. 29, 2011

(54) ADJUSTABLE FENDER

(75) Inventors: Wesley K. Eklund, Muskegon, MI (US); Gary Roberts, Fruitport, MI (US); Tom Gerst, Twin Lake, MI (US); Andrew Hartmann, Muskegon, MI (US); Guido Redaelli, Albiate (IT)

(73) Assignee: Fleet Engineers, Incorporated, Muskegon, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/946,444

(22) Filed: Nov. 15, 2010

(65) Prior Publication Data

US 2011/0057410 A1    Mar. 10, 2011

Related U.S. Application Data

(63) Continuation of application No. 11/735,767, filed on Apr. 16, 2007, now Pat. No. 7,874,592.

(51) Int. Cl.
*B62D 25/18* (2006.01)
(52) U.S. Cl. ..................... 280/854; 280/154
(58) Field of Classification Search ............... 280/152.1, 280/152.2, 152.3, 154, 156, 159, 847, 848, 280/851, 854
See application file for complete search history.

(56) References Cited

U.S. PATENT DOCUMENTS

| | | | |
|---|---|---|---|
| 817,203 A | 4/1906 | Thompson |
| 1,094,134 A | 4/1914 | Dickerson |
| 1,158,947 A | 11/1915 | McGregor |
| 1,434,477 A | 11/1922 | Bury |
| 1,489,062 A | 4/1924 | Buman |
| 1,519,860 A | 12/1924 | McClelland |
| 1,537,852 A | 5/1925 | Mandry |
| 1,550,247 A | 8/1925 | Firquain |
| 1,511,813 A | 9/1925 | Dunn |
| 1,593,063 A | 7/1926 | Dunn |
| 1,667,209 A | 4/1928 | Langdon |
| 2,068,732 A | 1/1937 | Cadwallader |
| 4,377,294 A | 3/1983 | Lockwood et al. |
| 4,591,178 A | 5/1986 | Mortvedt et al. |
| 4,712,805 A | 12/1987 | McMillen |

(Continued)

FOREIGN PATENT DOCUMENTS

DE     8609090 U1     7/1987

(Continued)

*Primary Examiner* — J. Allen Shriver, II
*Assistant Examiner* — Bridget Avery
(74) *Attorney, Agent, or Firm* — McGarry Bair PC

(57) ABSTRACT

An adjustable fender vehicle has an upper wall with inner and outer side walls. The inner side wall includes an elongated longitudinal clamping edge and an interior wall depends from the underside of upper wall between the inner and outer walls. The interior wall has an elongated longitudinal opening in registry with the elongated longitudinal clamping edge in the inner side wall for receiving a fastener for adjustable mounting of the fender to a vehicle. The inner side wall includes an elongated longitudinal opening in registry with the elongated longitudinal opening in the interior wall and the elongated longitudinal clamping edge is formed in the elongated longitudinal opening in the inner side wall. The elongated longitudinal opening is configured to receive a mounting arm that is adapted to extend through the elongated longitudinal opening to the interior wall. Fasteners on the mounting arm clamp the fender to the mounting arm.

19 Claims, 8 Drawing Sheets

U.S. PATENT DOCUMENTS

| | | | |
|---|---|---|---|
| 5,165,712 | A | 11/1992 | Fuller |
| 5,950,975 | A | 9/1999 | Zieske |
| 6,029,999 | A | 2/2000 | O'Day |
| 6,186,527 | B1 | 2/2001 | Monhollen et al. |
| 6,199,883 | B1 | 3/2001 | Gable |
| 6,354,625 | B1 | 3/2002 | Lambertus |
| 6,592,147 | B2 | 7/2003 | Lambertus |
| 6,634,664 | B1 | 10/2003 | Kojima |
| 6,648,373 | B2 | 11/2003 | Hawes |
| 6,893,048 | B2 | 5/2005 | Rush et al. |
| 7,073,804 | B2 | 7/2006 | Hawes |
| 7,384,071 | B2 * | 6/2008 | Hartmann et al. ............ 280/854 |
| 2002/0024213 | A1 | 2/2002 | Hawes |
| 2004/0004351 | A1 | 1/2004 | Hawes |

FOREIGN PATENT DOCUMENTS

| | | |
|---|---|---|
| DE | 9409662 U1 | 8/1994 |
| EP | 1172283 A | 2/2002 |
| EP | 1564115 A2 | 8/2005 |
| EP | 1619108 A1 | 1/2006 |
| FR | 2690125 A | 10/1993 |

* cited by examiner

ADJUSTABLE FENDER

CROSS-REFERENCE TO RELATED APPLICATION

This application is a continuation of U.S. patent application Ser. No. 11/735,767, filed Apr. 16, 2007, now U.S. Pat. No. 7,874,592, issued Jan. 25, 2011, which is incorporated herein in its entirety.

BACKGROUND OF THE INVENTION

1. Field of the Invention

This invention relates to a fender for covering the wheels of a heavy-duty vehicle. In one of its aspects, the invention relates to a fender that is configured to mount to a truck chassis through a mounting arm that extends beneath the upper panel or the fender. In another of its aspects, the invention relates a fender that is configured to mount to a truck chassis through an adjustable connection to a mounting arm.

2. Description of the Related Art

Heavy-duty vehicles, such as a tractor-trailer, use fender assemblies to cover the otherwise exposed drive wheels of the tractor. As illustrated in FIG. 1, a typical prior art fender assemblies A comprises a mounting arm B that extends laterally from the vehicle frame C, mounting brackets D, and a fender E. The mounting brackets D are fixed to the fender E and receive the mounting arm B. The mounting arm B bears a preponderance of the weight of the fender E and maintains the fender E in a desirable position above the drive wheels F. At one end, the mounting arm B can be fixed or rotatably mounted to the vehicle frame C. When the mounting arm B is rotatably mounted, the fender assembly A is rotationally adjustable relative to the vehicle frame C. The other end of the mounting arm B is secured to the fender E by the mounting brackets D.

In the exemplary prior art fender assembly A in FIG. 1, the mounting brackets D are secured to the fender E by traditional mechanical fasteners, which are shown as bolts G, that extend through the fender E. These and other conventional mechanical means typically require permanent alteration of the fender. For example, to mount the fender assembly to the vehicle frame, the mounting arm, the mounting brackets, and the fender are aligned relative to each other and to the vehicle frame, holes are drilled through the fender in locations to accomplish the desired alignment, and then the bolts or other mechanical fasteners are inserted through the mounting brackets and the holes in the fender. Because this process is very labor intensive and the working area near the vehicle frame is usually limited, it is often difficult to accurately mount the fender in the desired position. Typically, the fender is placed in proper location with respect to the wheels. This location is critical and cannot be altered. Then, the mounting arm B is mounted to the frame and the position of the mounting brackets on the fender is observed and the hole locations are marked. Often, there is very limited maneuvering room for the mounting arm and there is not much room to adjust the position of the mounting arm B with respect to the fender. If the holes are drilled in incorrect locations, the fender can be improperly positioned or the mounting brackets D might not align with the holes. Frequently, the fender must be marked again and new holes drilled in the fender. Other means of fixing the mounting brackets to the fender include welding, soldering, or other chemical bonding means. While chemical bonding methods securely fix the mounting brackets to the fender, they permanently alter the fender and have deficiencies similar to those of mechanical fastening means, especially if the brackets are improperly mounted.

Examples of prior art mounting brackets are disclosed in several patents. U.S. Pat. No. 5,950,975 to Zieske (Zieske '975) discloses a fender mounting assembly comprising a fender mounting plate having traditional circular clamps for receiving a mounting arm. The clamps include bolts that can be tightened to securely grasp the arm, and the fender mounting plate is coupled to a lower surface of a fender. Alternatively, the arm can be directly attached to the fender by bolts and nuts. Another fender assembly is disclosed in U.S. Pat. No. 4,591,178 to Mortvedt et al. (Mortvedt '178). In Mortvedt '178, U-shaped clamps sized to receive mounting tubes are secured to an upper surface of the fender with bolts that extend through the clamps and holes in the fender. U.S. Pat. No. 4,377,294 to Lockwood et al. (Lockwood '294) discloses a fender assembly comprising a mounting arm that sits within a support seat formed in an upper surface of the fender panel. Clamping plates are positioned inside the mounting arm and against the bottom surface of the fender panel. Threaded bolts extend through the clamping plates, the mounting arm, and the fender panel to securely couple the mounting arm to the fender panel. Additionally, U.S. Pat. No. 1,094,134 to Dickerson (Dickerson '134) discloses a fender assembly with a bent tubular arm having an inner horizontal portion and an outer horizontal portion that is received by brackets, which are positioned under the fender and fastened thereto with bolts.

Fender bracing assemblies were commonly used on early passenger automobiles to hold fenders under tension and to lift fenders to their proper positions. Such assemblies commonly comprised a rod or wire that connects clamps or brackets coupled to fenders on both sides of the automobile. The clamps typically wrap around the edges of the fenders and include means for retaining the rod or wire. For example, U.S. Pat. No. 1,489,062 to Burnam (Burnam '062) discloses a fender brace comprising a flexible wire cable disposed between two front fenders. A pair of bifurcated hook clamps, each having a hook portion and an eye portion, is mounted to each fender such that the hook portions wrap around the edges of the fenders. The wire cable is threaded through the eyes and secured in place with nuts and bolts. Similar braces are described in U.S. Pat. No. 1,434,477 to Bury (Bury '477) and U.S. Pat. No. 1,511,813 to Dunn (Dunn '813). The clamps in the Bury '477 and the Dunn '813 devices are single-piece components that wrap around both the inside and outside edges of the fenders. Fender bracing assemblies differ from fender mounting assemblies in that the latter bear a preponderance of the fender weight while the former merely hold a pair of fenders under tension to prevent vibration and to assist in holding them above the automobile wheels.

French Demande No. 2 690 125 to Doyen discloses an adjustable mounting between a bicycle fender and a bicycle frame in which the fender of U-shaped configuration in cross-section has in a central portion on the bottom of the side walls a series of detents. A U-shaped clamping member that is attached to the bicycle straddles the fender and has inturned ends that fit below the bottom edges of fender side walls and have several bosses interface with the detents on the bottom edge of the fender side walls to clamp the fender to the bicycle frame.

SUMMARY OF THE INVENTION

According to the invention, a vehicle fender adapted to adjustably mount to a vehicle frame without alteration of the fender comprises a panel defined by an upper surface with inner and outer side edges that include, respectively, depending inner and outer side walls, and an interior wall on the underside of the panel between the inner and outer side walls. The inner side edge of the fender has teeth and notches that are adapted to mate with a clamping member that has complementary teeth and notches and that is supported by a support arm that is adapted to be mounted to a vehicle frame.

In one embodiment, a pocket that extends beneath the underside of the panel from the inner side edge to the interior wall and is adapted to receive a mounting arm beneath the upper surface of the panel. The pocket can be formed by transverse walls, the inner side wall and the interior wall. The pocket transverse walls can extend from the inner side wall to the interior wall. The interior wall can have an elongated longitudinal opening for receiving a fastener on the support arm for adjustable mounting of the fender to a vehicle.

On another embodiment, the inner side wall includes an elongated longitudinal clamping edge in registry with the elongated longitudinal opening in the interior wall, and the teeth and notches are formed in the elongated longitudinal clamping edge in the inner side wall. In addition, the inner side wall can include an elongated longitudinal opening in registry with the elongated longitudinal opening in the interior wall and the elongated longitudinal clamping edge can be formed on an edge of the elongated longitudinal opening in the inner side wall.

Further according to the invention, a vehicle fender adapted to adjustably mount to a vehicle without alteration of the fender comprises an upper wall configured to cover a portion of vehicle wheel and with inner and outer side edges; inner and outer side walls that depend, respectively, from the inner and outer side edges of the upper wall; an interior wall depending from the underside of upper wall between the inner and outer walls; and an undercut pocket that extends beneath the underside of the upper wall from the inner side edge thereof to the interior wall and that is adapted to receive a mounting arm between the inner side edge and the interior wall.

In one embodiment, the pocket can be formed by transverse walls, the inner side walls and the interior wall, and the interior wall can have an elongated longitudinal opening for receiving a fastener for adjustable mounting of the fender to a vehicle.

In a preferred embodiment, the inner side wall includes an elongated longitudinal clamping edge in registry with the elongated longitudinal opening in the interior wall. Further, the inner side wall can include an elongated longitudinal opening in registry with the elongated longitudinal opening in the interior wall and the elongated longitudinal clamping edge can be formed in the elongated longitudinal opening in the inner side wall.

In another embodiment, teeth and notches can be formed in the elongated longitudinal clamping edge in the inner side wall. The teeth and notches can be adapted to mate with a clamping member that has complementary teeth and notches. The clamping member can be supported by a support arm that is adapted to be mounted to a vehicle frame.

Further according to the invention, a vehicle fender comprises an upper wall configured to cover a portion of vehicle wheel and with inner and outer side edges; inner and outer side walls that depend, respectively, from the inner and outer side edges of the upper wall, wherein the inner side wall includes an elongated longitudinal clamping edge. An interior wall depends from the underside of upper wall between the inner and outer walls and has an elongated longitudinal opening in registry with the elongated longitudinal clamping edge in the inner side wall for receiving a fastener for adjustable mounting of the fender to a vehicle.

In one embodiment, a pair of transverse walls depends from the underside of the upper wall and extends from the inner side wall to the interior wall.

In anther embodiment, the inner side wall includes an elongated longitudinal opening in registry with the elongated longitudinal opening in the interior wall and the elongated longitudinal clamping edge is formed in an edge of the elongated longitudinal opening in the inner side wall. In addition, the elongated longitudinal opening in the inner side wall can be configured to receive a mounting arm that is adapted to mount to a vehicle frame at one end and that is adapted to extend from the elongated longitudinal opening in the inner side wall to the interior wall.

In a preferred embodiment, the fender, including any pocket, is integrally molded of a synthetic plastic resin. Preferably, the synthetic plastic resin is a high density polypropylene.

The invention provides a system for adjustably mounting a fender to a mounting arm without physical alteration of the fender. Further, the mounting arm is concealed beneath the fender for aesthetic purposes.

DESCRIPTION OF AN EMBODIMENT OF THE INVENTION

Figure 2:
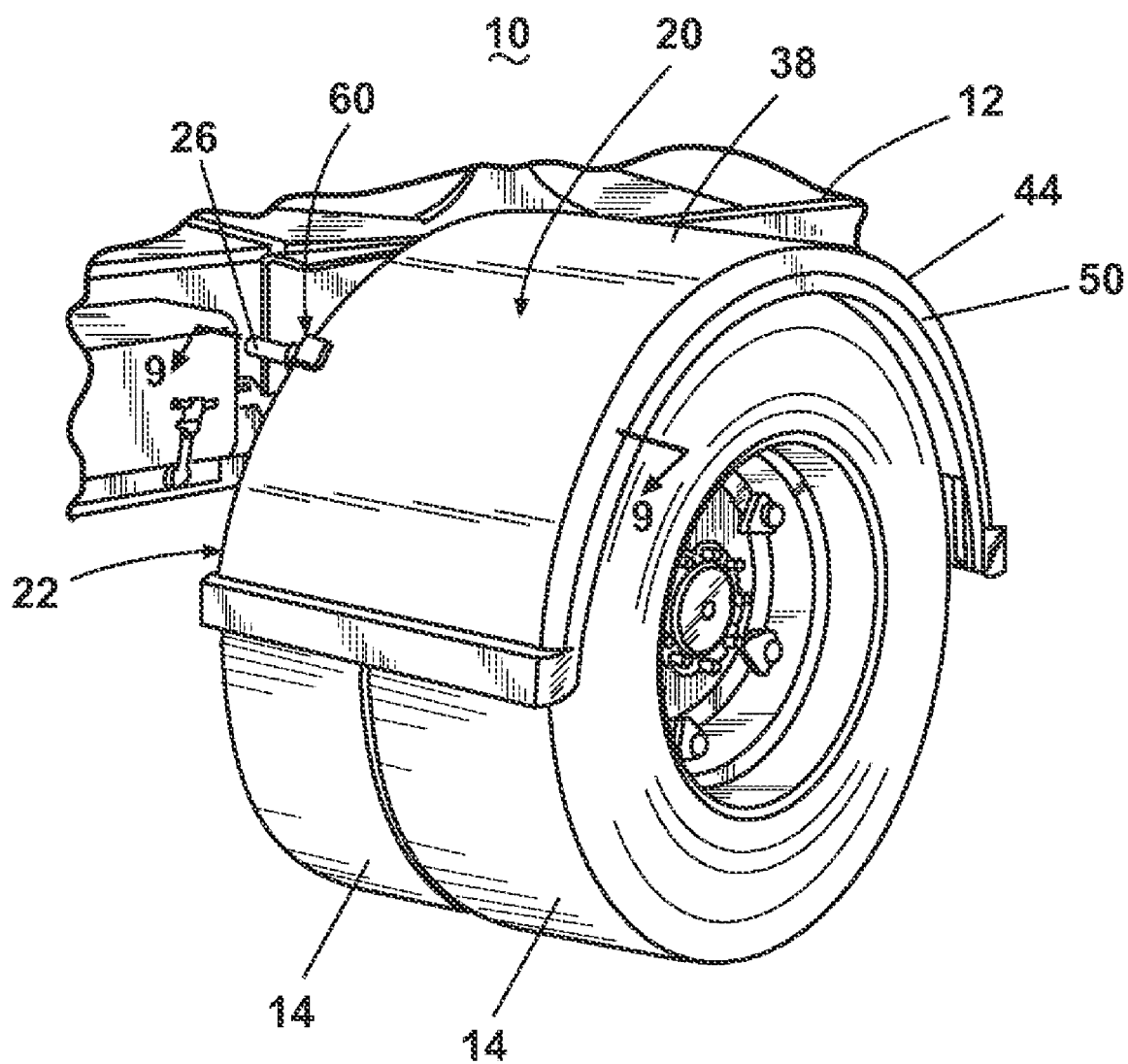
FIG. 2 is a top perspective view of a fender assembly according to the invention comprising a fender and a clamping member mounted on the fender and receiving the mounting arm.
Figure 3:
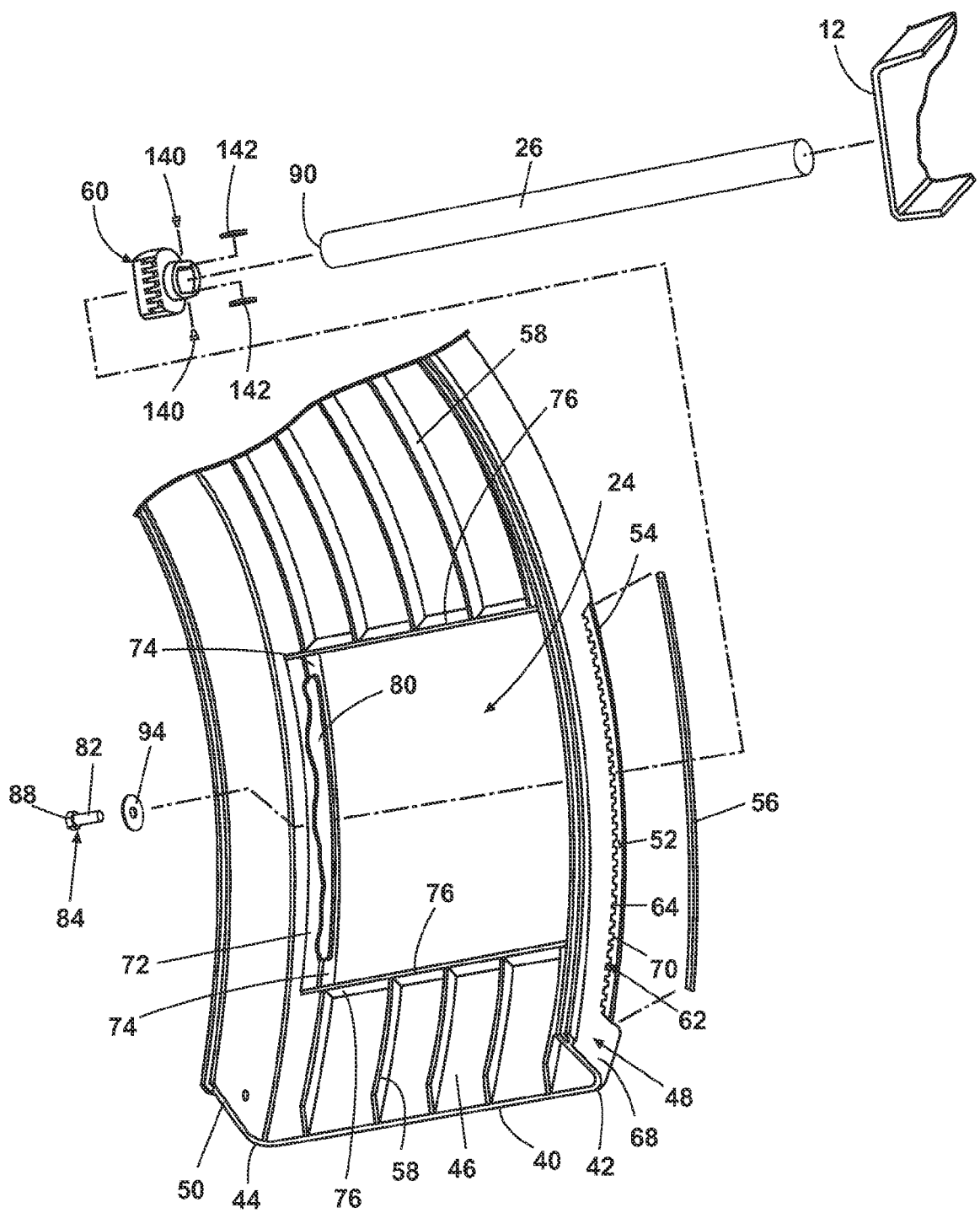
FIG. 3 is an underside exploded view of the fender assembly in FIG. 2.
Figure 4:
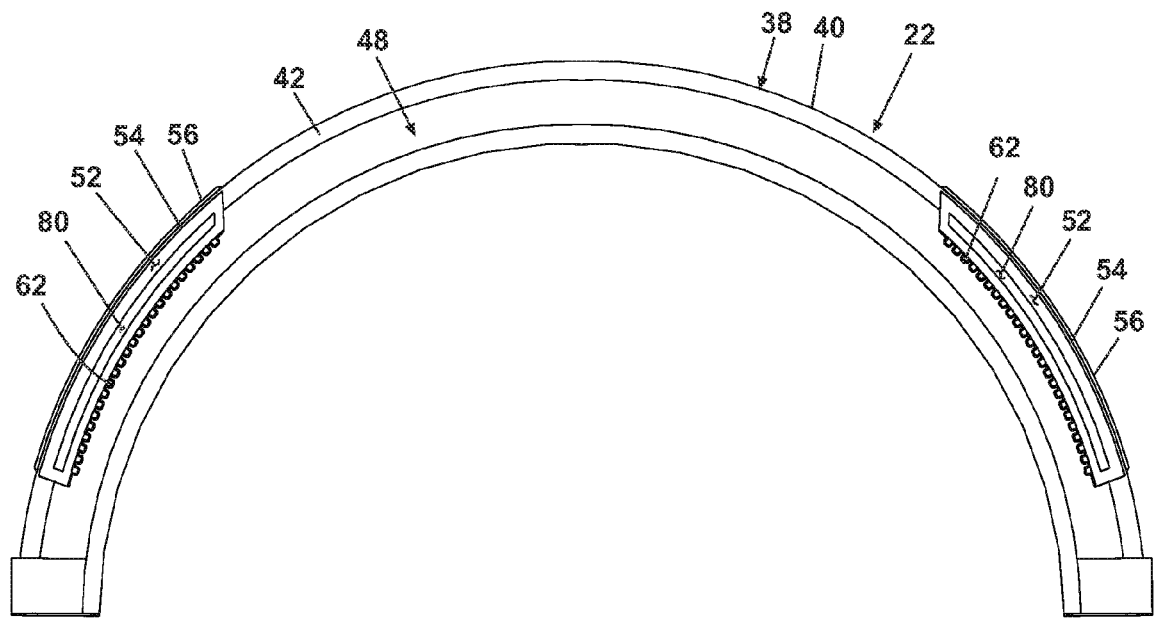
FIG. 4 is a side view of the fender of FIG. 2.
Figure 5:
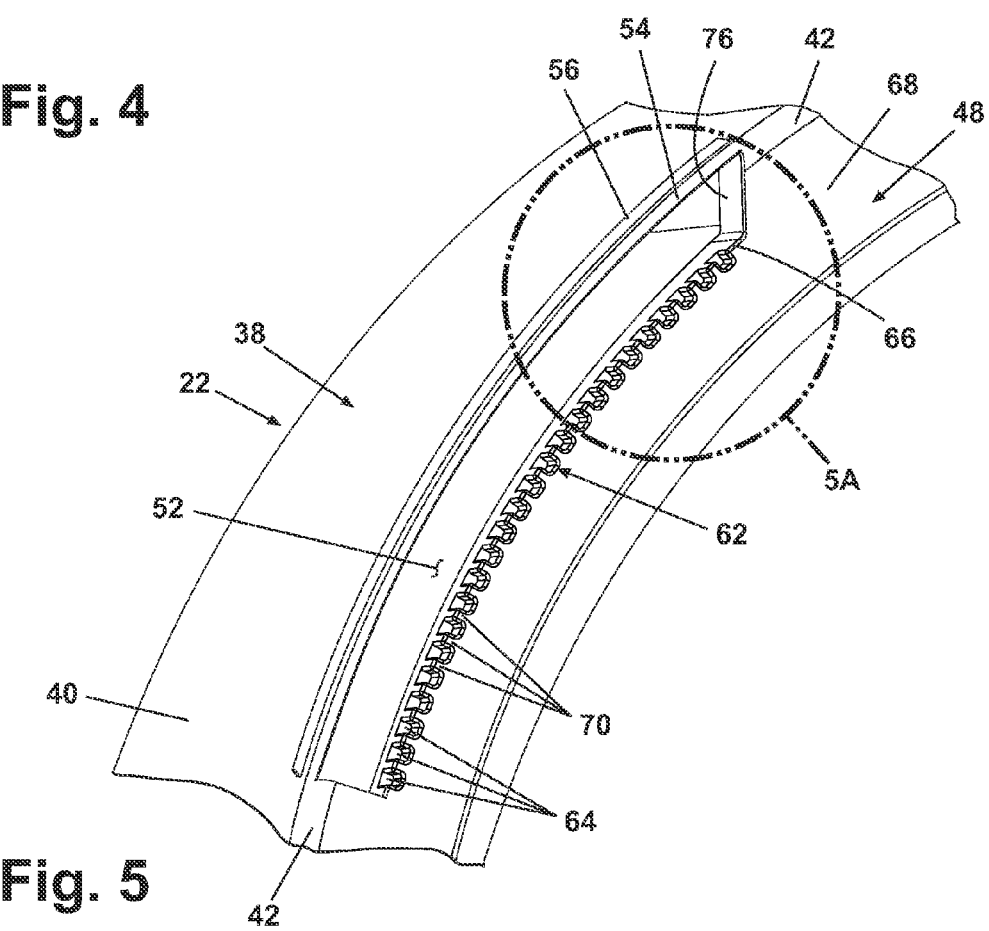
FIG. 5 is an enlarged top perspective view of an elongated opening in the fender shown in FIG. 2.
Figure 5A:
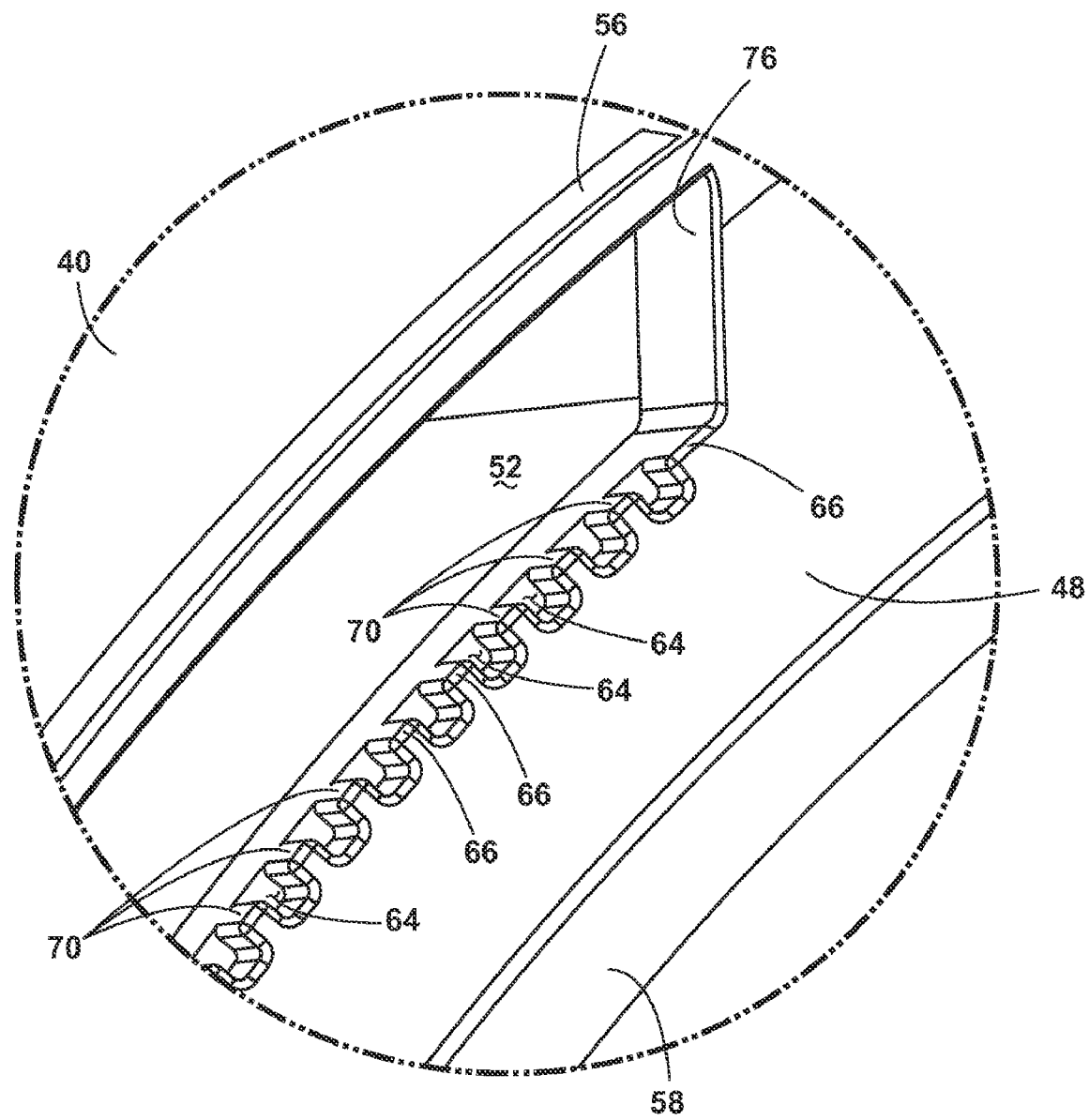
FIG. 5A is and enlarged portion of area 5A of FIG. 5.

Referring now to the figures, and particularly to FIGS. 2 and 3, a portion of a heavy-duty vehicle in the form of a tractor-trailer 10 has a frame 12 to which ground-engaging wheels 14 are rotatably mounted. A fender assembly 20 according to the invention comprises a fender 22, an integral pocket 24, and a mounting arm 26 that mounts the fender 22 to the vehicle frame 12. While the mounting arm 26 is illustrated as a straight rod, the mounting arm can have any suitable form, including a rotationally adjustable mounting arm.

Mounting arms are well known and not germane to the invention; therefore, the mounting arm 26 will not be discussed in further detail.

Figure 9:
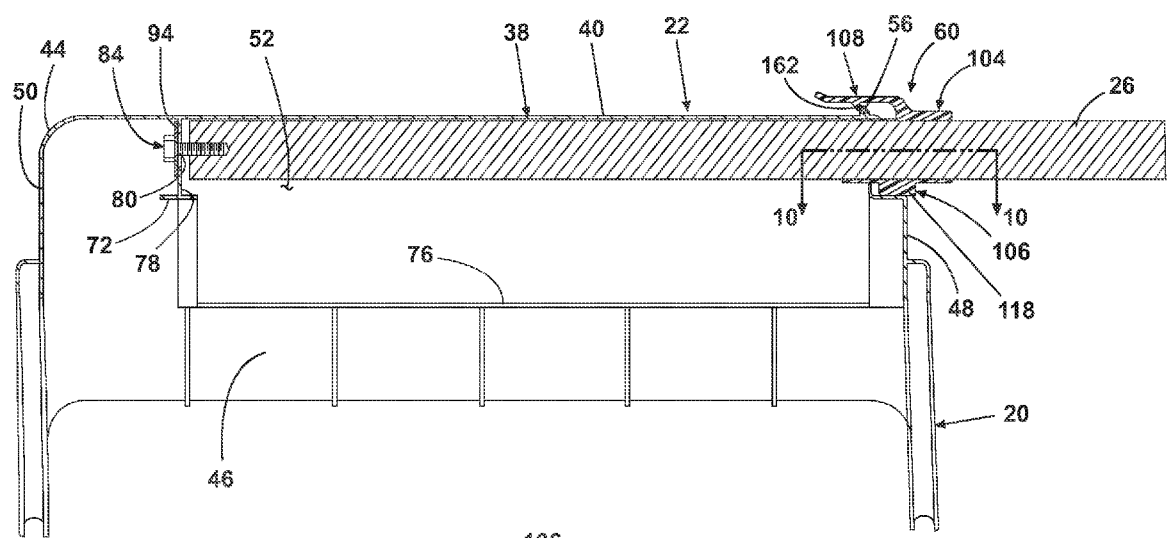
FIG. 9 is a sectional view taken along the line 9-9 of FIG. 2.
Figure 10:
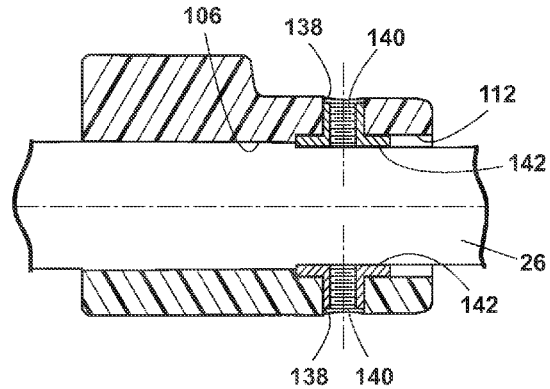
FIG. 10 is a partial sectional view along lines 10-10 of FIG. 9.

Referring now to FIGS. 2-5 and 9, the fender 22 has a width slightly greater than that of the wheels 14 and is curved to overlie one of the wheels 14. The fender 22 is illustrated as a full single axis fender that extends through a 180-degree arc; however, it is within the scope of the invention for the fender 22 to be of any type or size. For example, the fender 22 can be single-axis or tandem; full (180-degree), half (90-degree), or quarter (45-degree); and single or double-radius. The fender 22 comprises a panel 38 defined by rounded inner and outer edges 42, 44, respectively, and having a relatively flat upper surface 40 and a ribbed lower surface 46 formed by internal ribs 58. Extending radially inwardly from the inner and outer edges 42, 44, respectively, are inner and outer side walls 48, 50, respectively, which terminate at a lower portion thereof in a pair of depending flanges that define an elongated channel, as is best seen in FIG. 9.

The fender 22 further comprises the integral pocket 24, which is accessible through the inner side wall 48 via an elongated opening 52. The elongated opening 52 has a curvature substantially equal to that of the fender panel 38 and is sized to accommodate the mounting arm 26 and a portion of a clamping member 60, which will be described in more detail hereinafter. The elongated opening 52 extends through the inner side edge 42 to open the integral pocket 24 to the exterior of the fender 22. An elongated ridge 56 is located on the upper surface 40 of the panel 38 a short distance outward from the lateral edge 54. The ridge 56 adjustably receives a portion of the clamping member 60. The length of the ridge 56 preferably corresponds to the length of the elongated opening 52 although the ridge 56 can be longer or shorter than the elongated opening 52. Preferably, the elongated opening 52 is dimensioned so that it is open to a substantial portion of the integral pocket 24. The length of the elongated opening 52 is greater than the width of the clamping member 60. Consequently, the position of the clamping member 60 is adjustable within the elongated opening 52.

The elongated opening 52 further comprises a lower edge 62 having a plurality of relatively small notches 64 therein. The notches 64 extend radially downwardly from a top surface 66 of the lower edge 62 and extend transversely outwardly from an exterior surface 68 of the inner side wall 48. The notches 64 are preferably of a rectangular shape and are adapted to slideably receive a toothed portion of the clamping member 60, as will be described in more detail hereinafter. The notches 64 also form a plurality of teeth 70 therebetween that are received by a notched portion of the clamping member 60.

The integral pocket 24 is defined by an open bottom, an interior wall 74, and transverse side walls 76. A strengthening flange 72 extends along the bottom edge of the interior wall 74. The side walls 76 extend outwardly from the inner side wall 48 for a distance less than the width of the fender 22 to meet the interior wall 74. The interior wall 74 and the side walls extend radially outwardly from the lower surface 46.

The pocket interior wall 74 comprises a second elongated opening 80. The elongated opening 80 is preferably arcuate in shape and is aligned within the elongated opening 52. The elongated opening 80 is of a height greater than the diameter of a body 82 of a threaded bolt 84 adapted for threadable insertion into a threaded hole 86. The bolt 84 is a generally conventional bolt having a body 82 comprising a first threaded end and a second end terminating in a bolt head 88. The threaded hole 86 is formed in the outer end 90 of the mounting arm 26 and extends axially into the mounting arm 26. The threaded hole 86 is of a size small enough to prevent the head 88 of the bolt 84 from passing through but large enough to permit the body 82 of the bolt 84 to enter. The body 82 is of a size small enough to fit through the elongated opening 80. A washer 94 having a central opening adapted to accommodate the body 82 of the bolt 84 therethrough but not the head 88 is placed about the threaded hole 86 on the outer end 90 of the mounting arm 26. The washer 94 is of a size larger than the height of the elongated opening 74 when it is placed about the bolt 84 against the outer end 90 of the mounting arm 26.

It should be apparent to one skilled in the art that the fender 22 can comprise any number of integral pockets 24 located anywhere on the fender 22 for mounting the fender 22 to the vehicle 10. Each integral pocket 24 corresponds to its own clamping member 60 and its own corresponding mounting arm 26. The number of integral pockets 24 depends on factors such as the shape, size, and weight of the fender 22. For brevity, the description of the fender assembly 10 presented herein is limited to a single integral pocket. Although, the invention has been described with respect to one or more pockets on the inner side of the fender, which is preferred for aesthetic reasons, it is within the scope of the invention to provide pockets on each side of the fender or alternatively a single pocket that extends to the outer side wall 50 and the outer side wall 50 can have an opening and teeth as in the inner side wall 48.

The fender 22 can be made from a number of lightweight, rigid materials, such as steel, aluminum and synthetic resin. In a preferred embodiment, the fenders are injection molded of a synthetic thermoplastic resin. The type of resin can vary, depending on the desired properties. In a preferred embodiment, the fenders are injection molded from a high density polypropylene. The elongated ridge 56 is preferably formed integrally with the fender 22. Alternatively, the ridge 56 can be formed separately of any suitably rigid and durable material and attached be any suitable means, such as by spot welding.

Figure 6:
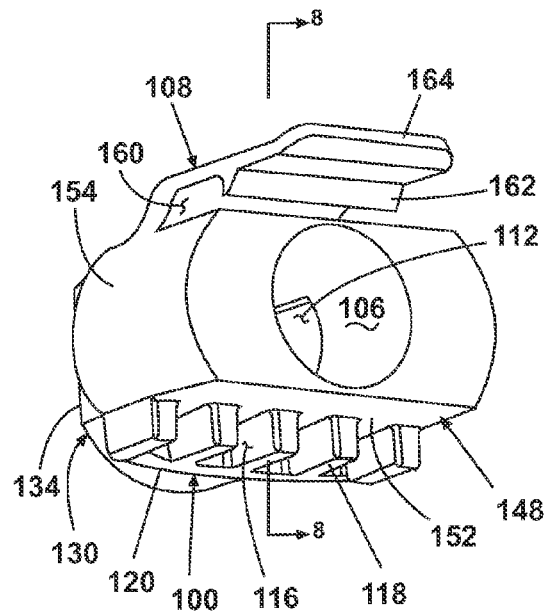
FIG. 6 is an inside bottom perspective view of a removable clamping member shown in FIG. 2.
Figure 7:
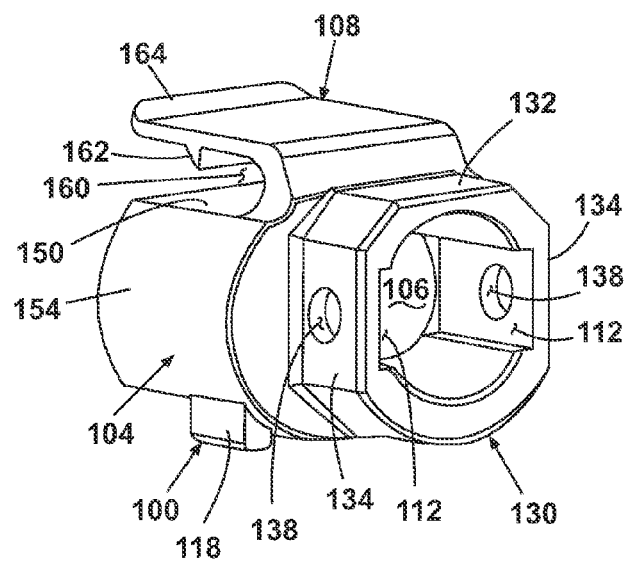
FIG. 7 is an outside perspective view of the removable clamping member shown FIG. 2.
Figure 8:
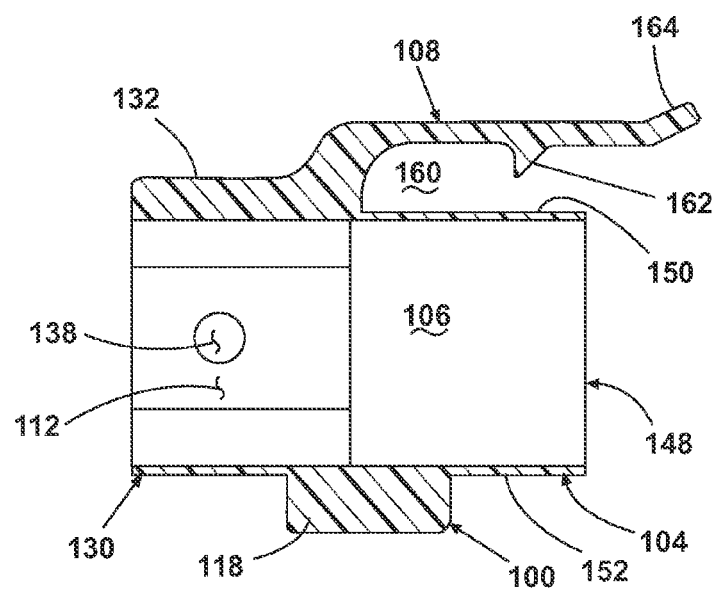
FIG. 8 is a sectional view taken along the line 8-8 of FIG. 6.

Referring now to FIGS. 6-8, each clamping member 60 comprises a base 100 with a curvature substantially equal to that of the fender panel 38, a body 104 having a bore 106 therethrough sized to receive the mounting arm 26, and a cantilevered flange 108 for interaction with the ridge 56. The bore 106 has two indentations 112 at the side portions of the inner end thereof.

The base 100 is located below the body 104 and comprises a plurality of notches 116. The notches 116 are adapted to receive the teeth 70 in the lower edge 62 of the elongated opening 52. The notches 116 also form a plurality of teeth 118 therebetween, which are sized for receipt by notches 64 in the lower edge 62 of the elongated opening 52. The notches 116 also create a strip 120 interconnecting the teeth 118 at a rearward portion of the base 100. This notch-and-tooth configuration facilitates a secure connection between the clamping member 60 and the fender 22 when the clamping member 60 is inserted into the elongated opening 52.

Referring particularly to FIGS. 6 and 7, the body 104 protrudes both forward and rearward of the base 100. At the rear, the body 104 comprises a generally cylindrical gripping portion 130 defining a portion of the bore 106 and the two indentations 112. The gripping portion 130 has a flattened top 132 and two flattened sides 134. Each of the flattened sides 134 includes an opening 138 for receiving a setscrew 140. At least one internally threaded T-nut 142 is positioned in one of the indentations 82 and extends into the opening 138. A setscrew 140 is threaded into each T-nut 142 and extends out the bottom thereof for gripping contact with mounting arm 26.

The forward portion of the body 104 comprises an extended portion 148 having top and bottom planar walls 150, 152 with the base 100 extending from the bottom planar wall 150. The planar walls 150, 152 are joined by two rounded side walls 154. Together, the planar walls 150, 152 and rounded side walls 154 define the remaining portion of the bore 106 such that the bore 106 is continuously formed within the gripping portion 130 and the extended portion 148.

The cantilevered flange 108 and the body 104 are partially separated by a groove 160 sized to receive the lateral edge 54, a portion of the fender panel 38, and the ridge 56. The flange 108 extends forward and slightly upward from the rearmost portion of the top planar wall 150. Together, the flange 108 and the top planar wall 150 define the groove 160. The flange 108 further comprises a detent 162 extending into the groove 160 and adapted to lock onto the ridge 56 to retain the clamping member 160 in position. A tab 164 on the foremost portion of the flange 108 enables a user to lift the flange 108 upwardly to deactivate the locking action of the detent 162.

The clamping members 60 can be formed of a number of different materials, including metal casting or synthetic resins. In a preferred embodiment of the invention, the clamping members are injection molded from a hard strong thermoplastic, such as Nylon. An exemplary material for the molded clamping members is a 15% fiberglass filled 6,6 Nylon with a stainless steel T-nut 142.

An exemplary description of the assembly of the fender assembly 20 follows. It will be apparent to one of ordinary skill in the fender art that the steps in the procedure of mounting the fender 22 to the vehicle 10 can transpire in any logical order and are not limited to the sequence presented below. The following description is for illustrative purposes only and is not intended to limit the invention in any manner.

Each mounting arm 26 is attached to the vehicle 10 in a conventional manner. For example, the mounting arm 26 can be mechanically secured to a desired location on the vehicle frame 12 by fasteners, such as bolts. Next, the mounting arm 26 is inserted through the bore 106 of the clamping member 60, and the clamping member 60 is slideably moved to a point on the mounting arm 26 inward of its final position. The fender 22 is then slid onto each mounting arm 26 so that the mounting arm 26 extends through the elongated opening 52, into the integral pocket 24, and to the elongated opening 80. One washer 94 is placed the body of bolt 84 and the body 82 of the bolt 84 is threaded into the threaded hole 86. The bolt 84 is tightened to achieve the desired axial positioning of the fender 22. Next, the clamping member 60 is slid along the mounting arm 26 into the elongated opening 52 as far as possible so that toothed portion of the base 100 registers with the toothed portion of the elongated opening 52, and also so that the detent 162 hooks onto the ridge 56. Once the clamping member 60 is firmly in place, each setscrew 140 is inserted into its respective opening 138, threaded into the T-nut 142, and tightened to secure the mounting arm 26 and to prevent axial movement thereof within the bore 106. In this manner, the fender 22 is clamped securely between the bolt and washer 94 and the clamping member 60, as is best shown in FIG. 9. Thus, the bolt and washer 94 form one clamping member and the clamping member 60 forms the other clamping member to securely clamp a portion of the fender 22 to the mounting arm 26.

Figure 1:
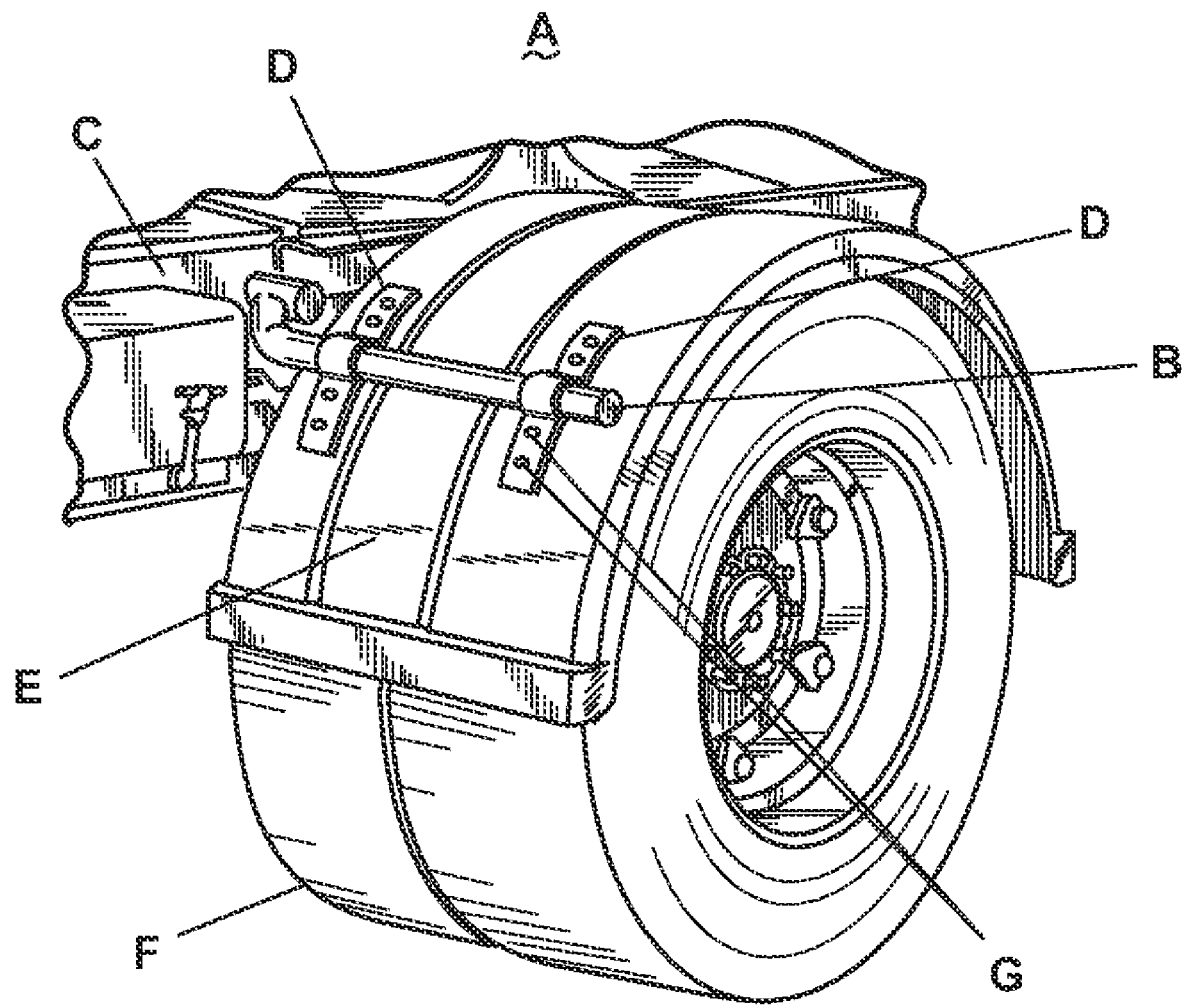
FIG. 1 is a perspective view of an exemplary prior art fender assembly.

If the fender assembly 20 is improperly mounted to the vehicle 10, e.g. if the fender 22 is too high or too low relative to the wheels 14, the fender assembly 20 can easily be partially disassembled to adjust the position thereof. The setscrews 140 are loosened, and then the tab 164 is lifted to slide the clamping member 60 inward along the mounting arm 26. The fender 22 can then be moved relative to the mounting arm 26, and the clamping member 60 can be reinserted in a new position in the elongated opening 52 in order to properly orient the fender 22. For example, if the fender 22 needs to be raised relative to the wheels 14, then the clamping member 60 is shifted to a lower position within the elongated opening 52. Depending on the shape of the fender 22 and the number of integral pockets 24 utilized, the fender 22 can be adjusted to various degrees in several directions. In prior art fender assemblies, such as that shown in FIG. 1, adjustment of the fender E is limited to rotating the fender E about the point where the mounting arm B is attached to the vehicle frame C or, alternatively, removing the fender from the mounting arm, drilling new holes in the fender and remounting the fender to the mounting arms through the bolts. In the fender assembly 20 according to the invention, the clamping members 60 are simply pulled from the elongated openings 52 and reinserted at a new desired location. Repositioning the clamping members 60 is a quick and easy process that requires neither extensive labor nor physical alteration of the fender 22. After the clamping member 60 have been moved, then the clamping member 60 is mounted to the mounting arm 26 as described above.

Figure 11:
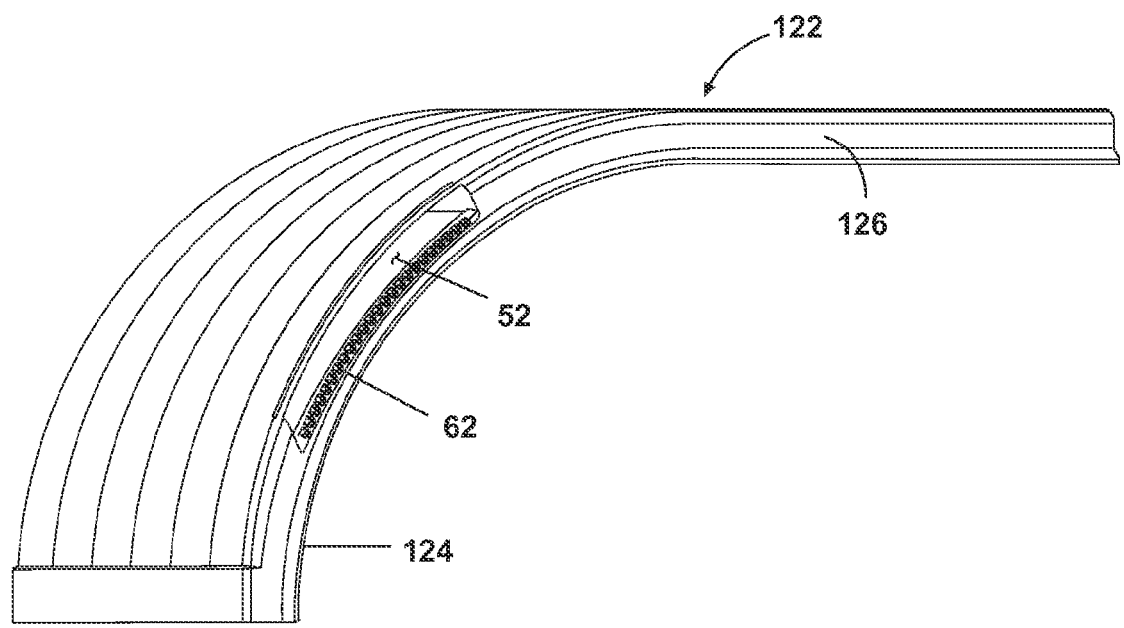
FIG. 11 is a top inside perspective view of a half fender module illustrating a second embodiment of the invention.
Figure 12:
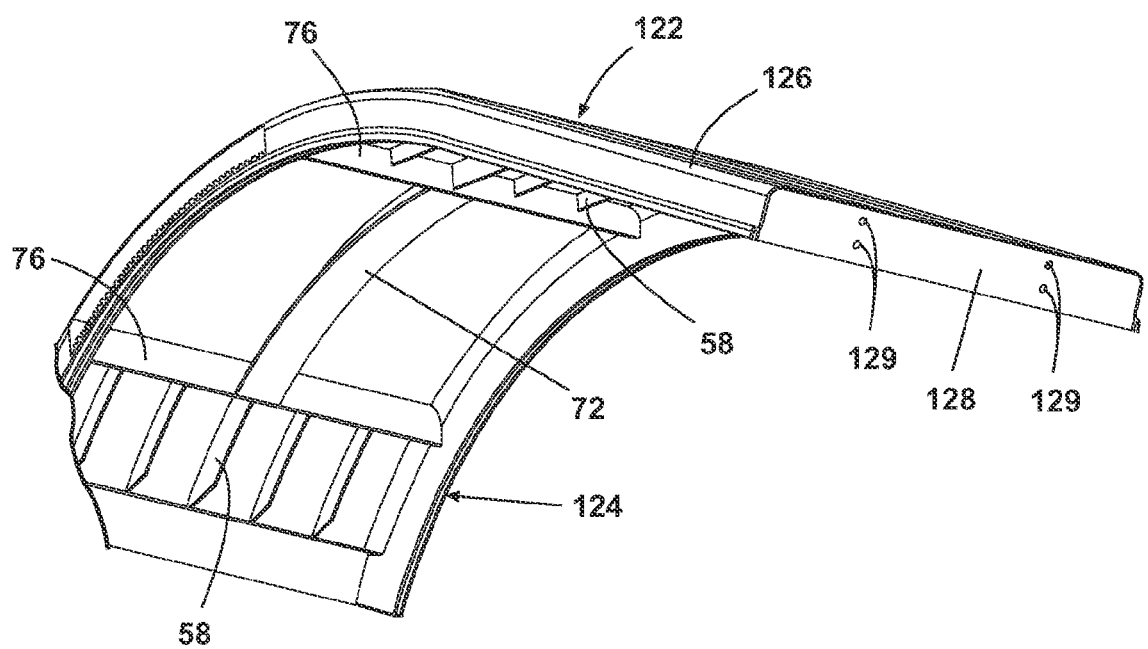
FIG. 12 is a bottom inside perspective view of the quarter fender module of FIG. 11.

Referring now to FIGS. 11 and 12, there is shown an alternate embodiment of the invention in which like numerals are used to describe like parts. In this embodiment, the fender 122 is a 90° or half fender that has a curved portion 124 and a straight portion 126. An end wall 128 having holes 129 for joining the 90° fender 122 to another 90° fender that is a mirror image of the fender illustrated in FIGS. 11 and 12. Each of the 90° fenders has on an inner sidewall 48 thereof an elongated opening 52 having elongated ridge 56 with notches 64 and teeth 70. Each fender is adapted to receive clamping member assemblies as described above with respect to FIGS. 1-10. The 90° fenders function in the same manner as the 180° fender described above. When two such 90° fenders are joined together, they form a fender for tandem wheels.

The invention addresses the deficiencies of the prior art by providing a fender assembly comprising a fender and clamping members adapted to be removably coupled thereto to facilitate mounting the fender to a vehicle without permanently altering (e.g. drilling or welding) the fender. The fender and the clamping member include reciprocal mating elements that interlock to securely retain the fender between the clamping member and the washer. These elements also easily separate for removing the fender from the mounting arm. Consequently, the fender can be quickly mounted to the vehicle and, if necessary, easily adjusted in several directions thereafter. The fender assembly does not require drilling, welding, or other laborious installation processes, and the fender can be accurately mounted to the vehicle in a desired position, even when working within a limited space on and near the vehicle frame. Further, because the fender assembly is adjustable, it can be utilized on several types of vehicles and can be transferred from one vehicle to another if desired. In addition to the foregoing, when the clamping members are used only on the inside surface of the fender, the mounting arm and mounting assembly is essentially hidden from normal view.

While the invention has been specifically described in connection with certain specific embodiments thereof, it is to be understood that the description is by way of illustration and not of limitation. Reasonable variation and modification are possible within the forgoing disclosure and drawings without departing from the spirit of the invention that is defined in the appended claims.

What is claimed is:

1. A vehicle fender adapted to adjustably mount to a vehicle without alteration of the fender wherein the fender comprises a panel defined by an upper surface with inner and outer side edges that include, respectively, depending inner and outer side walls, and an interior wall on the underside of the panel between the inner and outer side walls; the inner side edge of the fender has teeth and notches that are adapted to mate with a clamping member that has complementary teeth and notches and that is supported by a support arm that is adapted to be mounted to a vehicle frame.

2. A vehicle fender according to claim 1 and further comprising a pocket that extends beneath the underside of the panel from the inner side edge to the interior wall and is adapted to receive a mounting arm beneath the upper surface of the panel.

3. A vehicle fender according to claim 2 wherein the pocket is formed by transverse walls, the inner side wall and the interior wall, the transverse walls extend from the inner side wall to the interior wall, and the interior wall has an elongated longitudinal opening for receiving a fastener on the support arm for adjustable mounting of the fender to a vehicle.

4. A vehicle fender according to claim 3 wherein the inner side wall includes an elongated longitudinal clamping edge in registry with the elongated longitudinal opening in the interior wall, and the teeth and notches are formed in the elongated longitudinal clamping edge in the inner side wall.

5. A vehicle fender according to claim 4 wherein the fender is integrally molded of a synthetic plastic resin.

6. A vehicle fender according to claim 3 wherein the inner side wall includes an elongated longitudinal clamping edge in registry with the elongated longitudinal opening in the interior wall, and the teeth and notches are formed in the elongated longitudinal clamping edge in the inner side wall.

7. A vehicle fender according to claim 6 wherein the inner side wall includes an elongated longitudinal opening in registry with the elongated longitudinal opening in the interior wall and the elongated longitudinal clamping edge is formed in the elongated longitudinal opening in the inner side wall.

8. A vehicle fender adapted to adjustably mount to a vehicle without alteration of the fender wherein the fender comprises: an upper wall configured to cover a portion of a vehicle wheel; the upper wall has inner and outer side edges; inner and outer side walls that depend, respectively, from the inner and outer side edges of the upper wall; an interior wall depending from the underside of the upper wall between the inner and outer side walls; and a pocket that extends beneath the underside of the upper wall from the inner side edge thereof to the interior wall and that is adapted to receive a mounting arm between the inner side edge and the interior wall.

9. A vehicle fender according to claim 8 wherein the pocket is formed by transverse walls, the inner side walls and the interior wall; and the interior wall has an elongated longitudinal opening for receiving a fastener for adjustable mounting of the fender to a vehicle.

10. A vehicle fender according to claim 9 wherein the inner side wall includes an elongated longitudinal clamping edge in registry with the elongated longitudinal opening in the interior wall.

11. A vehicle fender according to claim 10 wherein the inner side wall includes an elongated longitudinal opening in registry with the elongated longitudinal opening in the interior wall and the elongated longitudinal clamping edge is formed in the elongated longitudinal opening in the inner side wall.

12. A vehicle fender according to claim 11 wherein teeth and notches are formed in the elongated longitudinal clamping edge in the inner side wall, wherein the teeth and notches are adapted to mate with a clamping member that has complementary teeth and notches and that is supported by a support arm that is adapted to be mounted to a vehicle frame.

13. A vehicle fender according to claim 11 wherein the fender including the pocket is integrally molded of a synthetic plastic resin.

14. A vehicle fender adapted to adjustably mount to a vehicle without alteration of the fender wherein the fender comprises: an upper wall configured to cover a portion of a vehicle wheel; the upper wall has inner and outer side edges; inner and outer side walls that depend, respectively, from the inner and outer side edges of the upper wall, wherein the inner side wall includes an elongated longitudinal clamping edge; and an interior wall depending from the underside of the upper wall between the inner and outer walls, wherein the interior wall has an elongated longitudinal opening in registry with the elongated longitudinal clamping edge in the inner side wall for receiving a fastener for adjustable mounting of the fender to a vehicle.

15. A vehicle fender according to claim 14 and further comprising a pair of transverse walls that depend from the underside of the upper wall and that extends from the inner side wall to the interior wall.

16. A vehicle fender according to claim 14 wherein the inner side wall includes an elongated longitudinal opening in registry with the elongated longitudinal opening in the interior wall and the elongated longitudinal clamping edge is formed in the elongated longitudinal opening in the inner side wall.

17. A vehicle fender according to claim 16 wherein the elongated longitudinal opening in the inner side wall is configured to receive a mounting arm that is adapted to mount to a vehicle frame at one end and that is adapted to extend from the elongated longitudinal opening in the inner side wall to the interior wall.

18. A vehicle fender according to claim 17 wherein the fender is integrally molded of a synthetic plastic resin.

19. A fender assembly according to claim 18 wherein the synthetic plastic resin is a high density polypropylene.

* * * * *